United States Patent [19]

Fruchey

[11] Patent Number: 4,500,464

[45] Date of Patent: Feb. 19, 1985

[54] COPPER AND MANGANESE RECOVERY FROM $C_5$-$C_9$ SATURATED ALIPHATIC MONOCARBOXYLIC ACIDS

[75] Inventor: Olan S. Fruchey, Corpus Christi, Tex.

[73] Assignee: Celanese Corporation, New York, N.Y.

[21] Appl. No.: 466,447

[22] Filed: Feb. 15, 1983

[51] Int. Cl.[3] .......................... C11C 1/00; C07F 1/08; C07F 11/00

[52] U.S. Cl. ...................................... 260/413; 252/28; 260/419; 260/429 R; 260/438.1

[58] Field of Search ........... 260/413 R, 429 R, 438.1, 260/419; 252/413

[56] References Cited

U.S. PATENT DOCUMENTS

| | | | |
|---|---|---|---|
| 3,846,460 | 11/1974 | Fite | 260/439 R X |
| 4,246,185 | 1/1981 | Wood | 260/439 R |
| 4,257,913 | 3/1981 | Fischer | 260/429 R |
| 4,289,708 | 9/1981 | Scott et al. | 260/413 R |

*Primary Examiner*—Helen M. S. Sneed
*Attorney, Agent, or Firm*—L. I. Grim; M. Turken

[57] ABSTRACT

A process is described for removing copper and manganese catalysts from an organic phase comprising a saturated aliphatic monocarboxylic acid containing 5 to 9 carbon atoms by extracting the catalysts with aqueous formic acid.

9 Claims, 1 Drawing Figure

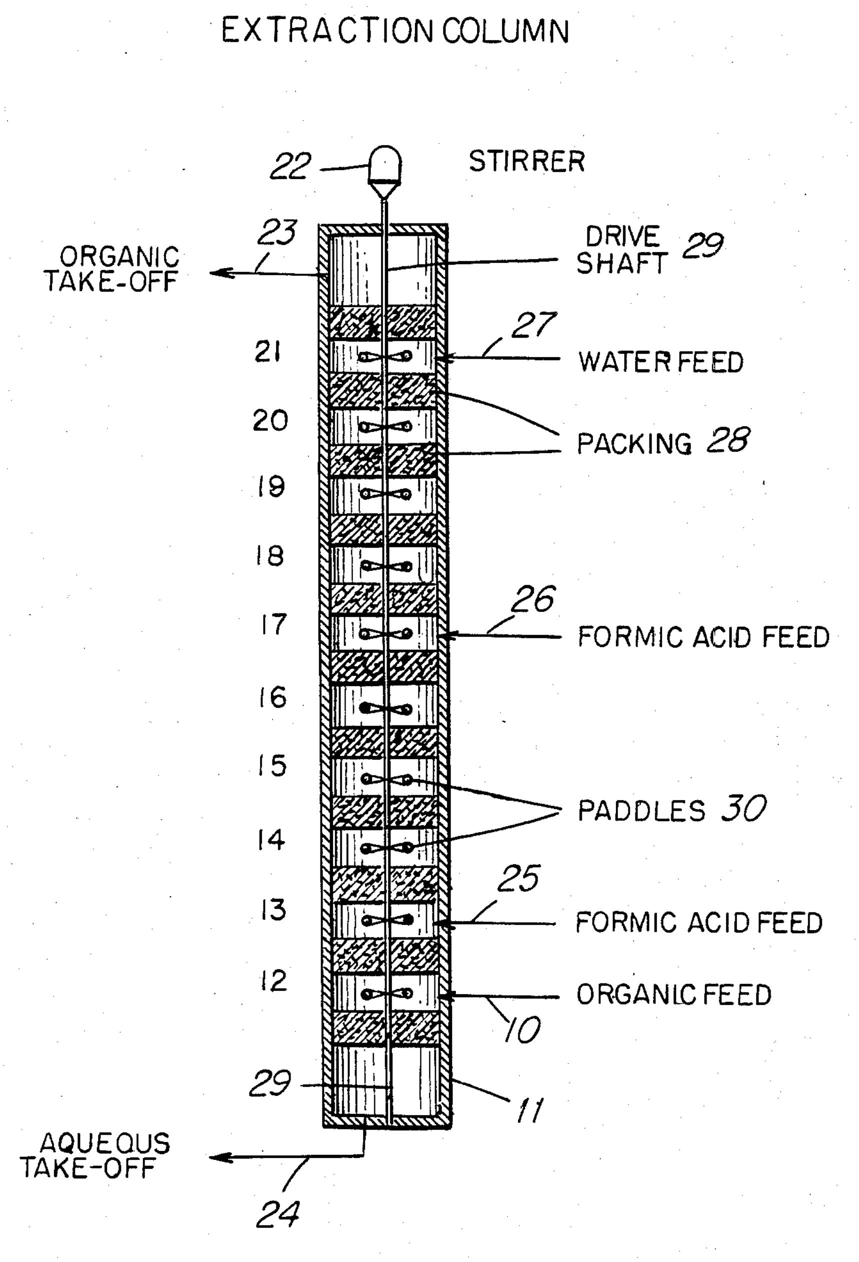
EXTRACTION COLUMN
22
STIRRER
23
ORGANIC TAKE-OFF
DRIVE SHAFT 29
27
WATER FEED
21
20
PACKING 28
19
18
26
17
FORMIC ACID FEED
16
15
PADDLES 30
14
25
13
FORMIC ACID FEED
12
ORGANIC FEED
10
29
11
AQUEOUS TAKE-OFF
24

COPPER AND MANGANESE RECOVERY FROM $C_5$–$C_9$ SATURATED ALIPHATIC MONOCARBOXYLIC ACIDS

The invention relates to a process for removing copper and manganese catalysts from a water-immiscible organic phase comprising a saturated aliphatic monocarboxylic acid containing 5 to 9 carbon atoms. More specifically, the catalyst metals, copper and manganese, are extracted from $C_5$–$C_9$ organic phase comprising monocarboxylic acids by the reaction of the metals with aqueous formic acid to form cupric and manganous formates which are highly soluble in water and have a low solubility in the water-immiscible organic phase and especially in the $C_6$–$C_9$ monocarboxylic acids. The insolubility of $C_6$–$C_9$ monocarboxylic acids in water results in the formation of an aqueous layer containing the metal formates and an organic layer of $C_6$–$C_9$ monocarboxylic acids substantially free of copper and manganese. Since valeric acid is very soluble in water, valeric acid containing manganese and copper ions can be combined with a water-immiscible organic solvent to form an organic phase in the presence of water. On the addition of aqueous formic acid to the organic phase containing valeric acid, manganese and copper ions, manganous and cupric formates will form and the formates, being highly soluble in water, will be removed from the organic phase into the aqueous phase. The organic phase containing the monocarboxylic acid is readily separated by decantation from the aqueous phase. Further purification by distillation of the recovered monocarboxylic acid from the organic phase is then achieved, without any tendency for copper to plate out.

BACKGROUND OF THE INVENTION

When oxidizing organic saturated aliphatic aldehydes containing 5 to 9 carbon atoms to the corresponding monocarboxylic acids, an important objective is to obtain sufficiently high yields and product efficiencies at high conversion levels in a single pass, to avoid the necessity to recycle significant amounts of unreacted starting materials. Catalysts comprising copper and manganese facilitate this objective, since they result in the production of larger amounts of acid per pass than do manganese catalysts alone. However, a disadvantage often resulting from the use of copper-manganese catalysts in aldehyde oxidation processes, particularly ones in which the reaction product must be distilled to recover the desired product, is the plating out of copper in the distillation apparatus. Plating out, can lead to undesirable mechanical problems, including erosion of reboilers and pump impellers, and rapid pump seal failures.

Copending U.S. application Ser. No. 345,890 filed Feb. 4, 1982, assigned to Celanese Corporation claims a process of the type described utilizing a copper-manganese catalyst. This process provides commercially attractive high carbon efficiencies of aldehyde to acid at high aldehyde conversions. A single stage or two stage liqud phase reactor system generally gives sufficiently high aldehyde conversions so that recycle of unreacted aldehyde is, in most cases, unnecessary. However, when the reaction mixture is distilled to recover the acid, copper tends to precipitate and plate out on the distillation apparatus unless something is done to prevent it.

One means of overcoming this problem is to add oxalic acid to precipitate copper and manganese from the reaction mixture as their oxalates, prior to the distillation step. This process is described in U.S. Pat. No. 4,289,708, issued Sept. 15, 1981 to Scott et al and assigned to Celanese Corporation. Copper and manganese can also be separated from the reaction mixture by precipitating them, again as their oxalates, by adding an aqueous oxalic acid solution. In this case, the manganese and copper oxalates precipitate into the aqueous phase, which can be readily separated from the organic acid product by decantation. The acid can then be further purified by distillation. However, aqueous oxalic acid cannot be used satisfactorily to treat mixtures containing valeric acid due to this acid's high solubility in water. This process is described in U.S. Pat. No. 4,246,185, issued Jan. 20, 1980 to Wood, Jr. and assigned to Celanese Corporation.

It is the purpose of this invention to provide an additional technique for removing manganese and copper from an organic phase comprising the $C_5$–$C_9$ saturated aliphatic monocarboxylic acids and avoid the use of oxalic acid and the oxalate precipitates to remove the catalyst metals from the acid products.

THE INVENTION

In accordance with this invention, aqueous formic acid is added and blended with a water-immiscible organic phase comprising saturated monocarboxylic acid containing from 5 to 9 carbon atoms to form cupric and manganous formates which are highly soluble in water but insoluble in the organic phase containing the monocarboxylic acid. This causes the formation of organic and aqueous phases and permits extraction of the manganous and cupric formates into the aqueous phase from the organic phase comprising the organic monocarboxylic acid which is insoluble in water. The organic phase, substantially free of the manganese and copper metals, can be separated by decantation from the aqueous phase. Without the metals present, the recovered organic monocarboxylic acid in the organic phase can be readily purified by normal distillation procedures. Water soluble valeric acid, containing manganese and copper ions must be treated differently from the water-immiscible $C_6$–$C_9$ saturated aliphatic monocarboxylic acids. There are at least two procedures which can be used. In one procedure, a major portion of the valeric acid can be rapidly distilled or flashed from the oxidation reaction product in the presence of an oxygen-containing gas to prevent the copper from plating on the distillation unit. The remaining valeric acid can be combined with an organic solvent such as hexene, heptene or the like to form a water-immiscible organic phase containing valeric acid, manganese and copper ions. Aqueous formic acid is added to the water-immiscible organic phase to produce cupric and manganous formate which are extracted from the organic phase into the aqueous phase. The organic phase is separated from the aqueous phase by decantation. The organic phase can be distilled to recover the remaining valeric acid or the organic phase can be burned as fuel, if desired. In accordance with the other procedure, valeric acid containing manganese and copper ions can be combined with a water-immiscible organic solvent such as hexene, heptene and the like to form an organic phase n the presence of water. On addition of aqueous formic acid to the organic phase, manganous and cupric formates will form and the formates, because of their high solubility in water, will be removed from the organic phase into the aqueous phase. The organic phase can be distilled to recover the valeric acid and the aqueous phase containing the manganous and cupric formates can be reacted with saturated aliphatic monocarboxylic acids containing 5 to 9 carbon atoms to produce the corresponding manganous and cupric alkanoates.

Copending application Docket No. 6183, assigned to the same assignee and filed concurrently with this application, describes a technique for recovering the cupric formate and the manganous formate from the aqueous phase by a procedure wherein the formates are heated to high tempratures in the presence of added saturated aliphatic monocarboxylic acids having 5 to 9 carbon atoms, forming the corresponding cupric and manganous alkanoates and distilling off the water and formic acid in the presence of an oxygen-containing gas to prevent the copper from plating. The cupric and manganous alkanoates recovered, are satisfactory oxidation catalysts and can be used in the oxidation of $C_5$–$C_9$ saturated aliphatic aldehydes to the corresponding saturated aliphatic monocarboxylic acids.

In this invention, the organic monocarboxylic acids, containing manganese and copper metals, which are treated by means of this process include n-valeric acid oxidized from n-valeraldehyde; n-heptanoic acid oxidized from n-heptanal; n-octanoic acid oxidized from n-octanal; n-nonanoic acid oxidized from n-nonanal and isomers of these acids.

The manganese and copper metals in the organic monocarboxylic acids are soluble and usually in the form of cupric and manganous compounds. Thus, the manganese must be kept in a +2 oxidation state to react with the formic acid. This can be accomplished by a reduction of the manganese by the unreacted aldehyde under a blanket of nitrogen wherein manganese will, in the presence of the reaction product, reduce from a +3 oxidation state to a +2 oxidation state. If formic acid reacts with manganese in the +3 oxidation state, an insoluble precipitate of manganese (III) formate will be produced and the effectiveness of the process of this invention will be reduced. It is for this reason that the soluble manganous and cupric salts are used for catalysts.

The aqueous formic acid added to the copper and manganese containing organic monocarboxylic acids, generally contains about 2 to about 20 weight percent formic acid, preferably about 4 to about 15 weight percent formic acid. The amount of formic acid added is sufficient to react with substantially all of the copper and manganese metals present. At least a molar equivalent of formic acid to the metals is required and an excess of formic acid is preferred. The volume ratio of the organic monocarboxylic acid to aqueous formic acid should exceed about 1 to 10, and is preferably about 10/1 to about 30/1. If an excess amount of formic acid is used and part of the acid remains in the organic monocarboxylic acid on the separation from the aqueous phase, mixing an additional amount of water with the organic monocarboxylic acid will readily remove the excess formic acid because of its high solubility in water.

It is desired to operate the extraction at ambient temperatures to save energy requirements although higher temperatures can be used with the disadvantage that as the temperatures increase the organic monocarboxylic acids can become more soluble in the aqueous phase and additional acids can be lost in the recovery system.

During and after the extraction of cupric and manganous formates from the organic phase into the aqueous phase, two distinct phases readily form an organic phase containing monocarboxylic acid and an aqueous phase. The organic phase, substantially free of the copper and manganese metals, can be separated from the aqueous phase containing the copper and manganese. The recovered organic monocarboxylic acid can then be further purified by distillation.

Any type of extraction equipment can be used to carry out the process of this invention. For example, a simple separatory funnel extraction or modification thereof can be used. For continuous operations, a countercurrent extraction can be used with at least a 2-staged addition of formic acid to improve the extraction efficiency. The staged addition of formic acid minimizes back extraction of formic acid into the organic phase. Also, in an effort to help minimize this back extraction, the extraction column is operated with the aqueous phase as the continuous phase while employing a water wash at the top of the column.

In the nonanal oxidation to nonanoic acid, acetic acid addition is required to prevent water phasing which results from the low solubility of oxidation-generated water in nonanoic acid. Water phasing in the oxidation reactor causes the manganese catalyst to plate out resulting in a loss of oxidation capacity. The acetic acid addition increases the water solubility in the nonanoic acid oxidation product and eliminates the manganese plating. The presence of acetic acid in the nonanoic acid oxidation product will not interfere with the extraction process of this invention. The acetic acid is present in both the organic and aqueous phases leaving the extraction column. It is readily separated from the nonanoic reaction product by distillation and can by recycled to the oxidation process, if desired.

The present invention is illustrated by the following examples.

EXAMPLE 1

This example illustrates the treatment of crude heptanoic and nonanoic oxidation products.

Heptanoic acid and nonanoic oxidation products were separately produced by the oxidation of heptanal and nonanal in the presence of 300 parts each of cupric acetate and manganous acetate at 60° C. Each of the reaction products of crude heptanoic acid and nonanoic acid were treated with aqueous formic acid leading to the extraction of the copper and manganese into the aqueous phase. The copper and manganese were extracted as cupric and manganous formate salts as a result of proton transfer from formic acid (the stronger acid) to acetate ion (the stronger conjugate base).

A separatory funnel extraction was used for each of the separations and the employment of aqueous formic acid containing 5 weight percent formic acid at a 20 to 1 (volume) organic to aqueous phase ratio yielded copper and manganese distribution coefficients of 0.005 for heptanoic acid and 0.001 for nonanoic acid. These small distribution coefficiencies indicate the higher solubility of the metal formate in water.

In Examples 2 to 5, a one inch, ten stage York-Scheibel countercurrent extraction column was used to evaluate continuous extraction of heptanoic and nonanoic acid oxidation products containing manganese and copper with aqueous formic acid. The column was operated with a two staged addition of aqueous formic acid, one at the lower end of the column and another at the upper end of the column to improve extraction efficiency. The staged addition of formic acid is required to minimize back extraction of formic acid into the organic phase. In an effort to help minimize this back extraction, the column was operated with the aqueous phase as the continuous phase as well as employing a water wash at the top of the extraction column.

Reference is made to the drawing which schematically depicts an Extraction Column. Organic feed is transmitted through line 10 into the lowest stage 12 to the extraction column 11 having ten stages (12-21), each stage containing a paddle 30, distributed throughout the column 11 and a stirrer 22 containing a shaft 29 which passes through the ten stages. Each of the stages contain a calming zone 28 consisting of a packing such as wire stainless steel mesh, course glass wool, and the like. Aqueous formic acid is added to the column 11 in two stages: one through line 25 into stage 13 and the other through line 26 into stage 17. Water is fed through line 27 into stage 21. The organic phase containing the organic $C_5$–$C_9$ saturated aliphatic monocarboxylic acid is taken off at the top of the column at line 23 to be purified further by distillation and the aqueous phase containing the manganese and copper is removed at the bottom of the column at line 24 which can be treated further to recover the manganese and copper catalysts.

The operating conditions used for the York-Scheibel columns are listed as follows in Table I:

TABLE I

| | |
|---|---|
| Column diameter | 1 inch |
| Number of stages | 10 |
| Phasing time per stage* | 4 minutes |
| Mixing time per stage** | 1.5 minutes |
| Temperature | Room Temp. (25° C.) |

TABLE I-continued

| | |
|---|---|
| Pressure | Atmospheric |
| Total aqueous formic feed rate | 0.6 milliliter/min. |
| Water feed rate | 0.3 milliliter/min. |
| Organic feed rate | 9 milliliter/min. |
| Continuous phase | Aqueous |

* stage volume / Total flow rate

** mixing volume / Total flow rate

EXAMPLE 2

Using the York-Scheibel column shown in the drawing and the operating conditions of Table I, nonanoic acid oxidation product containing manganese and copper metals was extracted with aqueous formic acid. The feeds used and the products obtained are shown in Table II:

TABLE II

Nonanoic Acid Extraction

| Stream | wt (g) | Cu g | Cu PPM | Mn g | Mn PPM | $H_2O$ g | $H_2O$ wt % | Formic Acid g | Formic Acid wt % |
|---|---|---|---|---|---|---|---|---|---|
| Organic Feed | 3637 | 0.7 | 200 | 0.6 | 160 | 3.6 | 0.1 | 0 | — |
| Formic Acid Feed | 257 | 0 | <1 | 0 | <1 | 237 | — | 20 | 7.8 |
| Water Feed | 152 | 0 | — | 0 | — | 152 | — | 0 | — |
| Organic Product (nonanoic acid) | 3709 | 0 | 2 | 0 | <1 | 77.9 | 2.1 | (3.1)[a] | — |
| Aqueous Product | 302 | 0.7 | 2400 | 0.7 | 2200 | 283.9 | — | 15.1 | 5.0 |
| Accountability (%) | 99 | 100 | | 117 | | 92 | | — | |

[a]Value assumed by difference after accounting for metal formates.

EXAMPLE 3

Using the same York-Scheibel column and operating conditions of Example 2, nonanoic acid oxidation product containing manganese and copper metals, was extracted with aqueous formic acid. The feeds used and the products obtained are described in Table III:

TABLE III

Nonanoic Acid Extraction

| Stream | wt (g) | Cu g | Cu PPM | Mn g | Mn PPM | $H_2O$ g | $H_2O$ wt % | Formic Acid g | Formic Acid wt % |
|---|---|---|---|---|---|---|---|---|---|
| Organic Feed | 3656 | 0.7 | 200 | 0.6 | 160 | 0 | <0.1 | 0 | — |
| Formic Acid Feed | 284 | 0 | <1 | 0 | <1 | 262.1 | — | 21.9 | 7.7 |
| Water Feed | 147 | 0 | — | 0 | — | 147 | — | 0 | — |
| Organic Product (nonanoic acid) | 3750 | 0 | 1 | 0 | <1 | 75 | 2.0 | (0.8)[a] | — |
| Aqueous Product | 308 | 0.7 | 2400 | 0.8 | 2800 | 285.5 | — | 18.8 | 6.1 |
| Accountability (%) | 99 | 100 | | 130 | | 88 | | — | |

[a]Value assumed by difference after accounting for metal formates.

EXAMPLE 4

Using the same York-Scheibel column and operating conditions of Example 2, heptanoic acid oxidation product containing manganese and copper metals, was extracted with aqueous formic acid. The feeds used and the products obtained are described in Table IV:

TABLE IV

Heptanoic Acid Extraction

| Stream | wt (g) | Cu g | Cu PPM | Mn g | Mn PPM | $H_2O$ g | $H_2O$ wt % | Formic Acid g | Formic Acid wt % |
|---|---|---|---|---|---|---|---|---|---|
| Organic Feed | 3649 | 0.8 | 220 | 0.8 | 210 | 3.6 | <0.1 | — | — |
| Formic Acid Feed | 278 | 0 | <1 | 0 | <1 | 242.2 | — | 35.8 | 12.9 |
| Water Feed | 353 | 0 | — | 0 | — | 353 | — | — | — |
| Organic Product | 3871 | 0 | <1 | 0 | <1 | 174 | 4.5 | (13.8)[a] | |

TABLE IV-continued

| | | Heptanoic Acid Extraction | | | | | | | |
|---|---|---|---|---|---|---|---|---|---|
| | | Cu | | Mn | | $H_2O$ | | Formic Acid | |
| Stream | wt (g) | g | PPM | g | PPM | g | wt % | g | wt % |
| (heptanoic acid) | | | | | | | | | |
| Aqueous Product | 332 | 0.7 | 2100 | 0.7 | 2000 | 310.7 | — | 19.9 | 6.0 |
| Accountability (%) | 98 | 88 | | 88 | | 81 | | — | |

[a]Value assumed by difference after accounting for metal formates.

EXAMPLE 5

Using the same York-Scheibel column and operating conditions of Example 2, heptanoic acid oxidation product containing manganese and copper metals, was extracted with aqueous formic acid. The feeds used and the products obtained are described in Table V:

TABLE V

| | | Heptanoic Acid Extraction | | | | | | | |
|---|---|---|---|---|---|---|---|---|---|
| | | Cu | | Mn | | $H_2O$ | | Formic Acid | |
| Stream | wt (g) | g | PPM | g | PPM | g | wt % | g | wt % |
| Organic Feed | 2596 | 0.5 | 210 | 0.5 | 210 | 0 | <0.1 | 0 | — |
| Formic Acid Feed | 278 | 0 | <1 | 0 | 1 | 240.7 | — | 37.3 | 13.4 |
| Water Feed | 51 | 0 | — | 0 | — | 51 | — | 0 | — |
| Organic Product (heptanoic acid) | 2726 | 0 | 2 | 0 | <1 | 114.5 | 4.2 | (28.1)[a] | |
| Aqueous Product | 143 | 0.4 | 2500 | 0.4 | 2500 | 134.2 | — | 8.0 | 5.6 |
| Accountability (%) | 98 | 80 | | 80 | | 85 | | — | |

[a]Value assumed by difference after accounting for metal formates.

It should be noted that in the extractions of Examples 2 through 5 substantially all of the metals have been removed from the organic product. The acid product can then be purified further by distillation without the occurrence of any copper plating.

What is claimed is:

1. A process for removing copper and manganese from a water immiscible organic phase comprising a saturated aliphatic monocarboxylic acid containing from 5 to 9 carbon atoms which comprises adding to said monocarboxylic acid an aqueous formic acid solution containing from about 2 to about 20 weight percent formic acid in a sufficient amount for the substantially complete reaction of the copper and manganese metals with formic acid to cupric formate and manganous formate; extracting said formates from said monocarboxylic acid into the resulting aqueous phase which separates an organic phase containing said monocarboxylic acid; decanting said organic phase and recovering from it said monocarboxylic acid substantially free of copper and manganese.

2. The process of claim 1 wherein the volume ratio of said monocarboxylic acid to aqueous formic acid exceeds about 1 to 10.

3. The process of claim 1 wherein the water immiscible organic phase is a saturated aliphatic monocarboxylic acid containing 7 to 9 carbon atoms.

4. The process of claim 1 wherein the organic water-immiscible phase is valeric acid in combination with a water-immiscible organic solvent.

5. The process of claim 2 wherein the aqueous formic acid used contains about 4 to about 15 weight percent formic acid.

6. The process of claim 1 wherein the volume ratio of said monocarboxylic acid to aqueous formic acid used is about 10 to 1 to about 30 to 1.

7. The process of claim 5 wherein the volume ratio of said monocarboxylic acid to aqueous formic acid used is about 10 to 1 to about 30 to 1.

8. The process of claim 7 wherein the saturated aliphatic monocarboxylic acid is heptanoic acid.

9. The process of claim 7 wherein the saturated aliphatic monocarboxylic acid is nonanoic acid.

* * * * *